United States Patent
Hung et al.

(10) Patent No.: US 11,615,320 B1
(45) Date of Patent: Mar. 28, 2023

(54) METHOD, PRODUCT, AND APPARATUS FOR VARIABLE PRECISION WEIGHT MANAGEMENT FOR NEURAL NETWORKS

(71) Applicant: Cadence Design Systems, Inc., San Jose, CA (US)

(72) Inventors: Ngai Ngai William Hung, San Jose, CA (US); Dhiraj Goswami, Wilsonville, OR (US); Michael Patrick Zimmer, Chicago, IL (US); Yong Liu, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 146 days.

(21) Appl. No.: 16/946,675

(22) Filed: Jun. 30, 2020

(51) Int. Cl.
  *G06F 16/22* (2019.01)
  *G06F 16/28* (2019.01)
  *G06N 3/10* (2006.01)
  *G06N 20/00* (2019.01)

(52) U.S. Cl.
  CPC .......... *G06N 3/10* (2013.01); *G06F 16/2282* (2019.01); *G06F 16/284* (2019.01); *G06N 20/00* (2019.01)

(58) Field of Classification Search
  None
  See application file for complete search history.

(56) References Cited

U.S. PATENT DOCUMENTS

| | | | |
|---|---|---|---|
| 5,267,185 A | 11/1993 | Akabane et al. | |
| 7,945,528 B2 | 5/2011 | Cytron et al. | |
| 9,128,697 B1 * | 9/2015 | Potter | G06F 9/30192 |
| 9,330,167 B1 * | 5/2016 | Pendar | G06F 16/328 |
| 10,643,705 B2 * | 5/2020 | Choi | G11C 13/004 |
| 10,817,260 B1 | 10/2020 | Huang et al. | |
| 2010/0306300 A1 | 12/2010 | Lu et al. | |
| 2016/0342890 A1 | 11/2016 | Young | |
| 2018/0165574 A1 | 6/2018 | Young et al. | |
| 2018/0307968 A1 * | 10/2018 | Bose | G06N 3/0472 |
| 2018/0314671 A1 | 11/2018 | Zhang et al. | |

(Continued)

OTHER PUBLICATIONS

Non-Final Office Action dated Jul. 25, 2022 U.S. Appl. No. 16/946,673.

(Continued)

*Primary Examiner* — Richard L Bowen
(74) *Attorney, Agent, or Firm* — Vista IP Law Group, LLP

(57) ABSTRACT

An approach includes identification of a machine learning model for processing and generating an ordered set of weights with varying precisions and metadata that specifies where those values can be found in order to allow the identification of weights needed during processing. In a first embodiment, the variable precision weights are separated into different memory segments where each segment has weights of only a single precision. In a second embodiment, the variable precision weights are provided in a memory where weights of different precisions are intermingled, and those weights are identified using a sequence of pairs of data representing a number of weights with the same precision and the precision of those weights. In some embodiments, both the first and second embodiments are combined, where some segments contain weights with only a single precision and at least one segment stores weights with different precisions within a respective segment.

20 Claims, 9 Drawing Sheets

(56) References Cited

U.S. PATENT DOCUMENTS

| | | | |
|---|---|---|---|
| 2019/0012296 | A1 | 1/2019 | Hsieh et al. |
| 2019/0042237 | A1 | 2/2019 | Azizi et al. |
| 2019/0236049 | A1 | 8/2019 | Vantrease et al. |
| 2019/0244086 | A1 | 8/2019 | Franca-neto |
| 2020/0097442 | A1 | 3/2020 | Jacob et al. |
| 2020/0244282 | A1 | 7/2020 | Bajic et al. |
| 2020/0410036 | A1 | 12/2020 | Huynh et al. |
| 2021/0035258 | A1 | 2/2021 | Ray et al. |
| 2021/0064992 | A1 | 3/2021 | Park et al. |
| 2021/0124794 | A1 | 4/2021 | Nair et al. |
| 2021/0157767 | A1 | 5/2021 | Ross et al. |
| 2021/0256360 | A1 | 8/2021 | Nam |
| 2021/0271451 | A1 | 9/2021 | Nair et al. |
| 2021/0303909 | A1 | 9/2021 | Gunnam et al. |
| 2021/0326686 | A1 | 10/2021 | Abdelaziz et al. |
| 2021/0377122 | A1* | 12/2021 | Pennello ............. G06F 16/2219 |
| 2022/0076066 | A1 | 3/2022 | Forgeat et al. |
| 2022/0129521 | A1 | 4/2022 | Surti et al. |

OTHER PUBLICATIONS

Kung et al., "Adaptive Tiling: Applying Fixed-size Systolic Arrays to Sparse Convolutional Neural Networks", 2018 24th International Conference on Pattern Recognition (ICPR) Beijing, China, (Aug. 20-24, 2018).

Ankur6ue. (Jul. 30, 2018). Understanding Matrix Multiplication on a Weight-Stationary Systolic Architecture. Retrieved from TELESENS: http://www.telesens.co/2018/07/30/systolic-architectures/.

Brownlee, J. (Jul. 23, 2018). When to Use MLP, CNN, and RNN Neural Networks. Retrieved from Machine Learning Mastery: https://machinelearningmastery.com/when-to-use-mlp-cnn-and-rnn-neural-networks/.

So, G. (Mar. 28, 2019). Should we Abandon LSTM for CNN? Retrieved from Medium: https://medium.com/ai-ml-at-symantec/should-we-abandon-lstm-for-cnn-83accaeb93d6.

Final Office Action dated Sep. 1, 2022 for U.S. Appl. No. 16/946,671.

Shao, "Lab 2: Systolic Arrays and Dataflows", UC Berkeley, Feb. 10, 2020, pp. 1-15. Retrieved from the Internet < URL: https://inst.eecs.berkeley.edu/~ee290-2/sp20/ >.

Github, "Gemmini—Berkeley's Systolic Array Generator", Apr. 26, 2020, 7 pages. Retrieved from the Internet < URL: https://web.archive.org/web/20200426231646/https://github.com/ucb-bar/gemmini >.

Su et al., "A Comparison of Single-Buffer and Double-Buffer Design in a Systolic Array Generator", Journal of Physics: Conference Series 1693, Nov. 9, 2020, pp. 1-6.

Non-Final Office Action for U.S. Appl. No. 16/946,672 dated Jun. 8, 2022.

Non-Final Office Action for U.S. Appl. No. 16/946,671 dated Mar. 2, 2022.

Yin et al., "Parana: A Parallel Neural Architecture Considering Thermal Problem of 3D Stacked Memory", IEEE Transactions on Parallel and Distributed Systems, vol. 30, No. 1, Jan. 2019, pp. 146-160.

Ahmad, S., et al., "Xilinx First 7nm Device: Versal AI Core (VC1902)," Xilinx Inc, dated Aug. 20, 2019.

Prieto, R., "Implementation of an 8-bit Dynamic Fixed-Point Convolutional Neural Network for Human Sign Language Recognition on a Xilinx FPGA Board," Department of Electrical and Information Technology Lund University, dated Mar. 17, 2019.

Jawandhiya, P., "Hardware Design for Machine Learning," International Journal of Artificial Intelligence and Applications (IJAIA), vol. 9, No. 1, dated Jan. 2018.

"Dell EMC Ready Solutions for AI—Deep Learning with Intel," Measuring performance and capability of deep learning use cases, Dell EMC, dated Jun. 2019.

Mayannavar, S., et al., "Hardware Accelerators for Neural Processing," International Journal of Computer Information Systems and Industrial Management Applications, ISSN 2150-7988 vol. 11 (2019) pp. 046-054, dated Apr. 17, 2019.

Non-Final Office Action dated Oct. 3, 2022 for U.S. Appl. No. 16/946,674.

Final Office Action dated Nov. 2, 2022 for U.S. Appl. No. 16/946,673.

Non-Final Office Action for U.S. Appl. No. 16/946,670 dated Nov. 9, 2022.

Notice of Allowance for U.S. Appl. No. 16/946,672 dated Jan. 9, 2023.

Notice of Allowance for U.S. Appl. No. 16/946,673 dated Feb. 1, 2023.

Notice of Allowance for U.S. Appl. No. 16/946,674 dated Feb. 2, 2023.

Yin et al., "A High Energy Efficient Reconfigurable Hybrid Neural Network Processor for Deep Learning Applications", Dec. 2017, pp. 968-982 (Year: 2017).

* cited by examiner

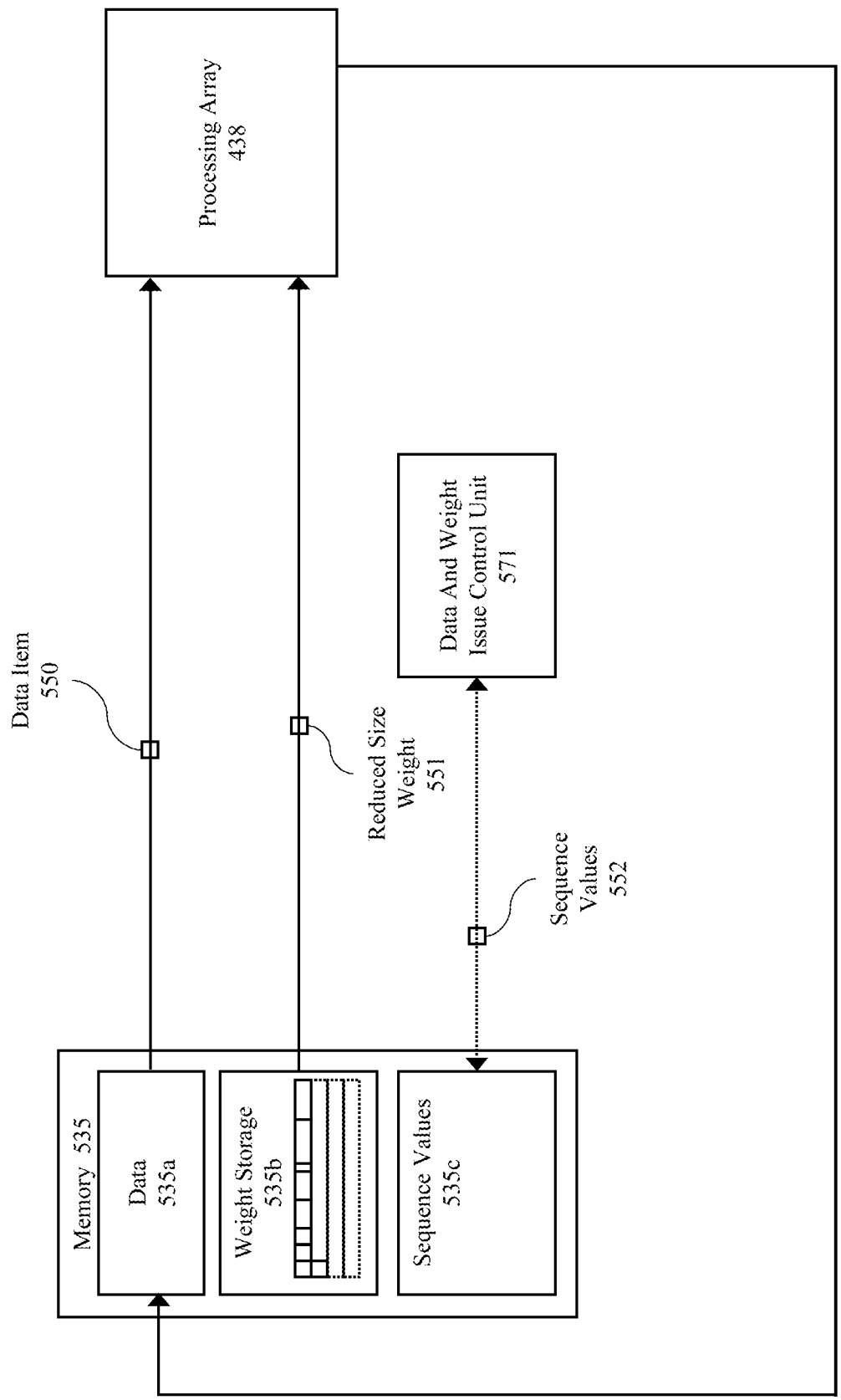

METHOD, PRODUCT, AND APPARATUS FOR VARIABLE PRECISION WEIGHT MANAGEMENT FOR NEURAL NETWORKS

RELATED APPLICATIONS

The present application is related to co-pending U.S. patent application Ser. No. 16/946,674 titled "METHOD, PRODUCT, AND APPARATUS FOR A MULTIDIMENSIONAL PROCESSING ARRAY FOR HARDWARE ACCELERATION OF CONVOLUTIONAL NEURAL NETWORK INFERENCE", U.S. patent application Ser. No. 16/946,673 titled "METHOD, PRODUCT, AND APPARATUS FOR A MACHINE LEARNING PROCESS LEVERAGING INPUT SPARSITY ON A PIXEL BY PIXEL BASIS", U.S. patent application Ser. No. 16/946,672 titled "METHOD, PRODUCT, AND APPARATUS FOR A MACHINE LEARNING PROCESS USING DYNAMIC REARRANGEMENT OF SPARSE DATA AND CORRESPONDING WEIGHTS", U.S. patent application Ser. No. 16/946,671 titled "METHOD, PRODUCT, AND APPARATUS FOR A MACHINE LEARNING PROCESS USING A SYSTOLIC ARRAY WITH MULTIMODAL WEIGHT MANAGEMENT", U.S. patent application Ser. No. 16/946,670 titled "METHOD, PRODUCT, AND APPARATUS FOR A MACHINE LEARNING PROCESS USING WEIGHT SHARING WITHIN A SYSTOLIC ARRAY HAVING REDUCED MEMORY BANDWIDTH" filed on even date herewith, which are hereby incorporated by reference in their entirety.

FIELD

This disclosure pertains to weight management for neural networks.

BACKGROUND

The increase of the computing capacity of computing devices and the interconnection of those devices has enabled multiple uses for artificial intelligence. For instance, artificial intelligence can now be found in digital personal assistants and various informational websites. Additionally, artificial intelligence has seen substantial use in image processing fields, such as in recognition of objects (e.g., an AI system in a car recognizing a pedestrian) and other types of image processing.

Various types of techniques have been employed to implement AI and machine learning. For example, one particularly dominant approach to AI is the processing of data using neural networks such as those used in deep learning techniques. Neural networks generally comprise a logical collection of logical nodes connected to other nodes by one or more weighted connections. These logical nodes are arranged in logical layers where each node is associated with the performance of the same type of operations and a plurality of nodes are provided in each convolution layer. For instance, one common type of operation used for convolutional neural networks are multiply accumulate operations.

One issue with using these neural networks is the memory bandwidth limitations. The data and the weights that are used to process the data in the neural network can consume lots of memory storage, and their transfer into a temporary memory and/or a processing apparatus can require the transfer of large amounts of this data. However, as some processing apparatuses have grown, the difficulty and/or resources required to provide data and weights to those processing apparatuses to reach their full potential throughput has become more difficult.

Thus, what is needed is an improved method, product, and apparatus for processing at least weights to improve storage and/or throughput of the number of weights over a given connection or path.

SUMMARY

Embodiments of the present invention provide an approach for a method, product, and apparatus for variable precision weight management for neural networks.

This approach largely includes identification of a machine learning model for processing and generating an ordered set of weights with varying precisions and metadata that specifies where those values can be found in order to allow the identification of weights needed during processing. In a first embodiment, the variable precision weights are separated into different memory segments where each segment has weights of only a single precision. In a second embodiment, the variable precision weights are provided in a memory where weights of different precisions are intermingled, and those weights are identified using a sequence of pairs of data representing a number of weights with the same precision and the precision of those weights. In some embodiments, both the first and second embodiments are combined, where some segments contain weights with only a single precision and at least one segment stores weights with different precisions within a respective segment.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

FIGS. 5A-5B illustrate an example arrangement and process flow according to an approach that includes a memory with weights of different precision intermingled according to one embodiment.

DETAILED DESCRIPTION

Embodiments of the present invention provide an approach for a method, product, and apparatus for variable precision weight management for neural networks.

Figure 1A:
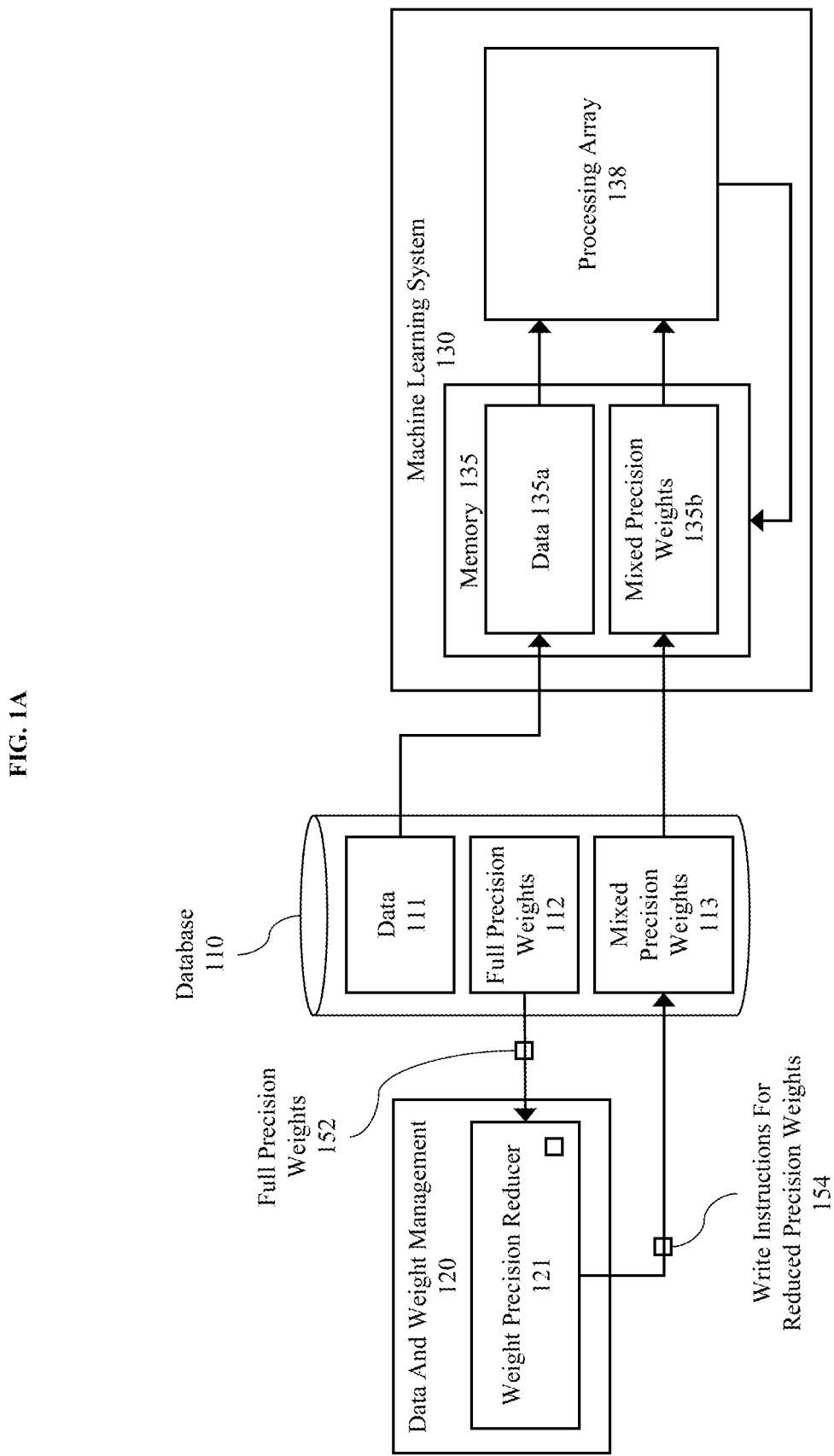
FIGS. 1A-1B depict example arrangements of an approach for variable precision weight management for neural networks according to some embodiments.
Figure 1B:
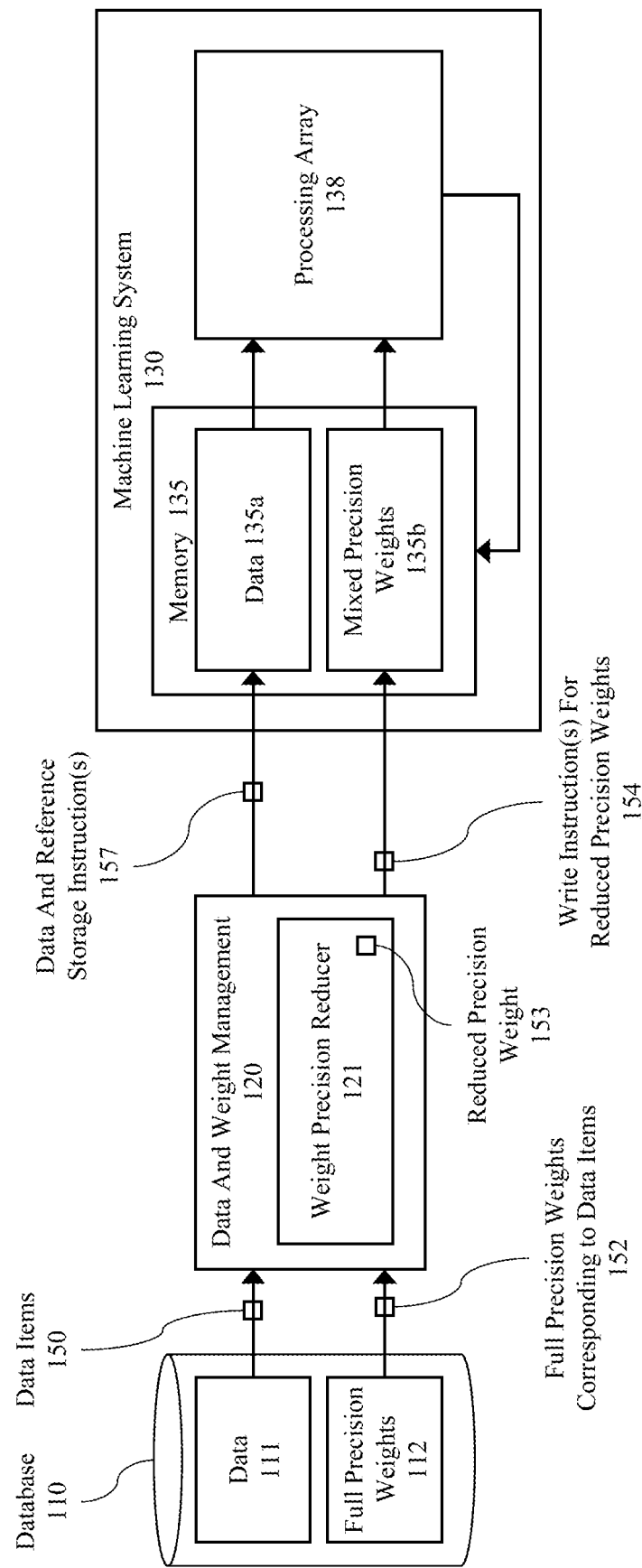

FIGS. 1A-1B depict example arrangements of an approach for variable precision weight management for neural networks according to some embodiments. Generally, the approach includes mixing weights with different precisions together for a single machine learning model. Additionally, the precision reduction can be performed inline or can be implement as a form of preprocessing. The preprocessing approach is illustrated in FIG. 1A and the inline approach is illustrated in FIG. 1B.

Generally, for a machine learning processing job each data value will correspond to one or more weights which may in turn correspond to different channels. These weights are used for multiply and accumulate operations at processing elements. For example, each data value is multiplied by a respective weight in each multiply accumulate operation— e.g., data value X is multiplied by a corresponding weight and accumulated with a result from a previous multiply and accumulate operation until all weights and data are processed for a given pixel on a particular channel. These weights might also be used for a next phase of the machine learning processing job—such as for processing in a subsequent convolution layer of a trained neural network, pooling, and/or activation. Pooling has multiple different variants that are generally directed towards combining values. For example, pooling can comprise any combination of max/average operations on a 2×2, 3×3, etc., sets of data with any number of different strides. Additionally, one or more activation functions might be utilized on the data—e.g., ReLu, ReLu6, Tanh, Sigmoid, and element wise operations on the results. These operations are made possible at least in part because each processing element is created such that the processing element can execute a number of instructions such as addition, subtraction, multiplication, division, and logical operations such as greater then, less then, or equal to. The present application focuses on the use of weights with particular emphasis on how those weights may be represented and used when they have varying precisions.

FIG. 1A depicts an example arrangement of an approach for variable precision weight management for neural networks according to some embodiments that include preprocessing of full precision weights to generated mixed precision weights.

The approach includes a database 110, a data and weight management element 120, and a machine learning system 130. The elements work together to utilize mixed precision weights in a machine learning process.

The database 110 includes data 111, full precision weights 112, and mixed precision weights 113. The database 110 may comprise one or more storage devices. For instance, the database could be provided within a single device, across a plurality of devices, or connected to a device over a networking connection, such as storage appliance connected within an internal or over an external network.

The data 111 may comprise a set of data for processing with the machine learning system 130. For example, an image captured by a user to be processed to identify one or more elements in the image (e.g., using a machine learning module trained to recognize a particular person's face). In some embodiments, the data 111 may be received at a later time, such as part of a machine learning processing job on an ad hoc basis.

The full precision weights 112 may comprise weights that were generated as part of training a machine learning model to recognize a particular aspect of an image (e.g., a submitter's relative). It is not uncommon to train a machine learning model using a fixed size weight. Thus, all weights might be generated as fixed size (e.g., 64-bit) values. However, those fixed size values may mostly comprise, at least for machine learning, relatively little useful information. In the context of a floating-point number, each value can be represented as a value having some precision, an exponent, and a sign. Thus, by decreasing the precision of the value and/or the maximum precision of the value, the amount of storage space consumed by those values can be decreased, and thus the amount of data that would need to be transferred to, or stored by, the processing apparatus. In the context of an integer weight it is even simpler. Simply decreasing the integer to a maximum positive or negative value for a number of bits to be used to represent the integer and reducing the number of bits used to represent the integer. Additionally, in some embodiments, converting the integer to a floating-point value, or the converse, may also provide resource savings while preserving some or all of the precision of those numbers.

The data and weight management element 120 can process full precision weights (e.g., full precision weights 152 from 112) to reduce the precision of those weights. Various techniques can be applied to reduce the precision of the weights as is largely known. For instance, weights could be reduced to a maximum precision or to a precision below the maximum where the least significant bits fall below a threshold (e.g., 0 or 1) using the weight precision reducer. As disclosed here, the results of the processing by the weight precision reducer 121 can be output back to the database 113 at 154 for storage of those weights in a mixed manner. In some embodiments, the mixed precision weights are generated prior to a machine learning processing job. In some embodiments, management data may be required to identify the reduced precision weights or the specific arrangement and precisions of weights. This management data/activity is discussed further below.

The machine learning system 130 can utilize the mixed precision weights to then execute a machine learning processing job. The machine learning system 130 generally will comprise a memory 135 that includes storage for data to be processed (e.g., data 135a) which may be retrieved from data 111 and weights to use in that processing (e.g., mixed precision weights 135b) which may be retrieved from mixed precision weights 113. The memory may be provided in a single intermingled storage space or separate logical and/or physical regions for storage of the weights—e.g., provided using the same or different underlying physical storage device(s). In some embodiments, the memory for data and weights is provided with multiple read and/or write ports. The data and weight memory may be populated with the necessary data and weights to execute a machine learning processing job using any relevant technique. In some embodiments, the data and/or weights are organized in memory rows to allow for efficient reading/transferring of the data and/or weights efficiently, such as disclosed in U.S. patent application Ser. No. 16/946,673 filed on even date herewith and currently titled "METHOD, PRODUCT, AND APPARATUS FOR A MACHINE LEARNING PROCESS LEVERAGING INPUT SPARSITY ON A PIXEL BY PIXEL BASIS."

The processing array 138 receives input data and corresponding weights from the data and weight memory. This information may be processed using any known techniques. For example, the traditional approach aligns the entry and propagation of data through the array while multiply and accumulate operations are executed in order to provide an output from the array as the data is ultimately passed out of the array for further processing or inference/learning operations. Additionally, for machine learning processing jobs that are of sufficient size, one processing array of regions could be provided data/weights during one period, while another processing array is provided data/weights during a subsequent period while the first array of regions is processing what it received during the first period. This processing of data requires that the data and corresponding weights be read repeatedly and transferred from at least one storage location to another storage location that can be used by the machine learning system. Thus, the embodiments disclosed here provide an improved approach to weight management by providing a way to store weights more efficiently and thus improving the effective bandwidth of the memory subsystems. Additionally, in some embodiments, the machine learning system includes input logic for extending the weights for processing arrays that are configured for receiving weights of the same size. In some embodiments, the machine learning system 130 and/or processing array 138 such as disclosed in U.S. patent application Ser. No. 16/946,671 filed on even date herewith and currently titled "METHOD, PRODUCT, AND APPARATUS FOR A MACHINE LEARNING PROCESS USING A SYSTOLIC ARRAY WITH MULTIMODAL WEIGHT MANAGEMENT" and/or U.S. patent application Ser. No. 16/946,674 filed on even date herewith and currently titled "METHOD, PRODUCT, AND APPARATUS FOR A MULTIDIMENSIONAL PROCESSING ARRAY FOR HARDWARE ACCELERATION OF CONVOLUTIONAL NEURAL NETWORK INFERENCE."

FIG. 1B depicts an example arrangement of an approach for variable precision weight management for neural networks according to some embodiments that performs precision reduction in line with the transfer of information to the machine learning system.

The approach illustrated in FIG. 1B includes the database 110 having data 111 and full precision weights 112. However, whereas FIG. 1A illustrated the database 110 as having mixed precision weights 113, FIG. 1B omits this element. Similarly, whereas the data and weight management element 120 is illustrated as being bidirectionally connected to the database 110 in FIG. 1A, FIG. 1B illustrates this element as being connected inline between the database 110 and the machine learning system 130. Here, weights, and sometimes data, can be transmitted through the data and weight management element 120, with the output going to the machine learning system 130. For example, the data and a reference to a corresponding weight could be output at 157, with the corresponding weight being provided at 154. This information could then be used to identify the corresponding weight for a particular piece of data.

In some embodiments, the weights and data are passed as individual values or pairs of values. In some embodiments, multiple data and/or corresponding weight values are passed to the machine learning system at a time. In some embodiments, rows of data and/or weights from and/or to be stored in a memory are transferred at a time. In some embodiments, weights and data are transmitted separately.

Figure 2:
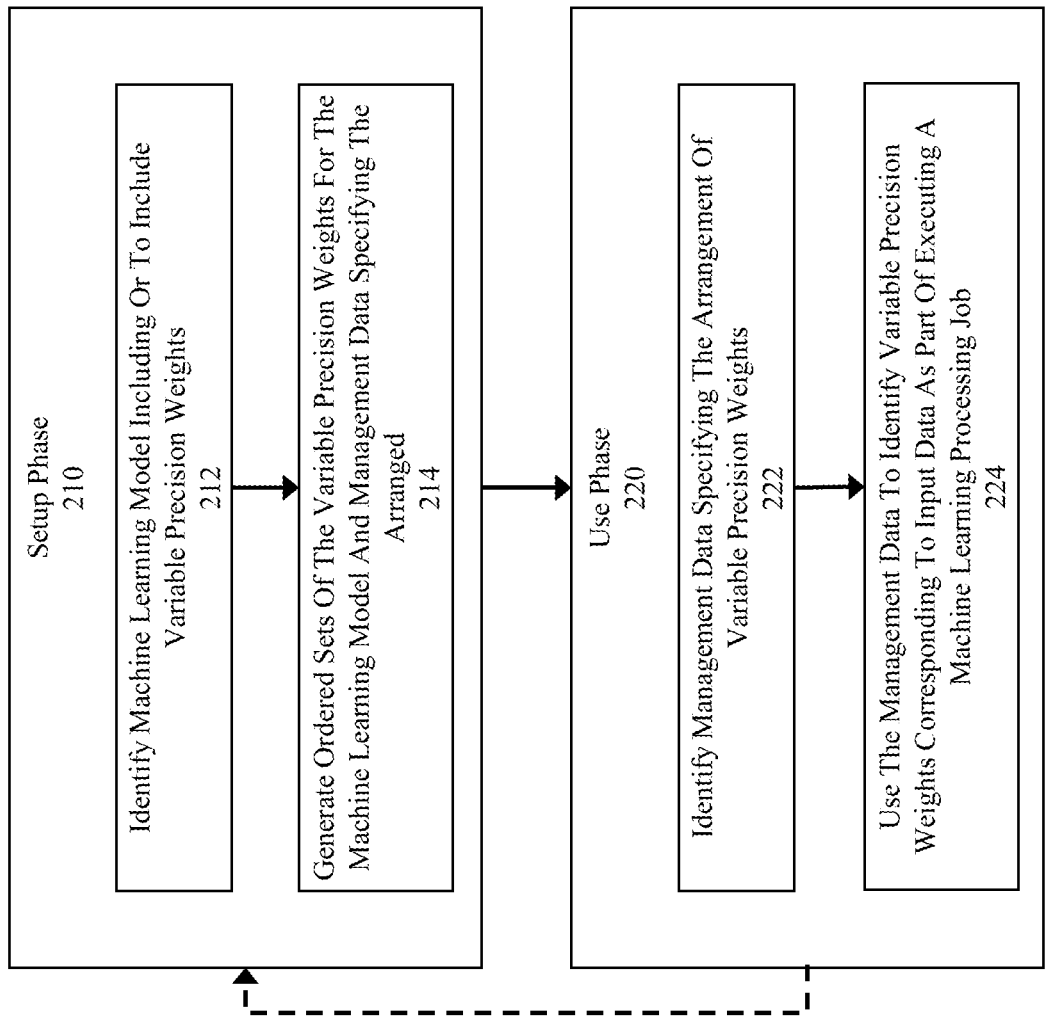
FIG. 2 illustrates a flow for managing variable precision weights according to some embodiments.

FIG. 2 illustrates a flow for managing variable precision weights according to some embodiments. Generally, the process has two phases. A first phase where data structures are generated and populated, and a second phase where those data structures are used to execute a machine learning processing job that leverages those structures.

The setup phase 210 operates on respective machine learning models. A machine learning model comprises at least weights and connections between layers. These weights and layers can be functionally represented in part by these weights. Thus, the setup phase 210 might include identification of a machine learning model that includes some weights (variable precision or otherwise). Additionally, the setup phase 210 might also include the generation of an ordered set(s) of variable precision weights for the machine learning model along with any necessary management data at 214. For example, each weight could be maintained in a storage area where all weights in that storage area have the same precision and multiple storage areas are provided for accommodating the different precisions. Alternatively, weights of different precisions could be intermingled together in a single memory segment, where management data is provided that can be used to determine the precision for each weight. Finally, in some embodiments, multiple regions could be provided that each comprises only weights with a single respective precision along with another region that includes weights with different precisions—e.g., for less common precisions.

During the use phase 220, the process will identify management data for use in identifying and using the weights and their precisions. In particular, management data specifying the arrangement of variable precision weights is identified at 222. Subsequently, the management data is used to identify/retrieve weights corresponding to input data as needed at 224.

Figure 3:
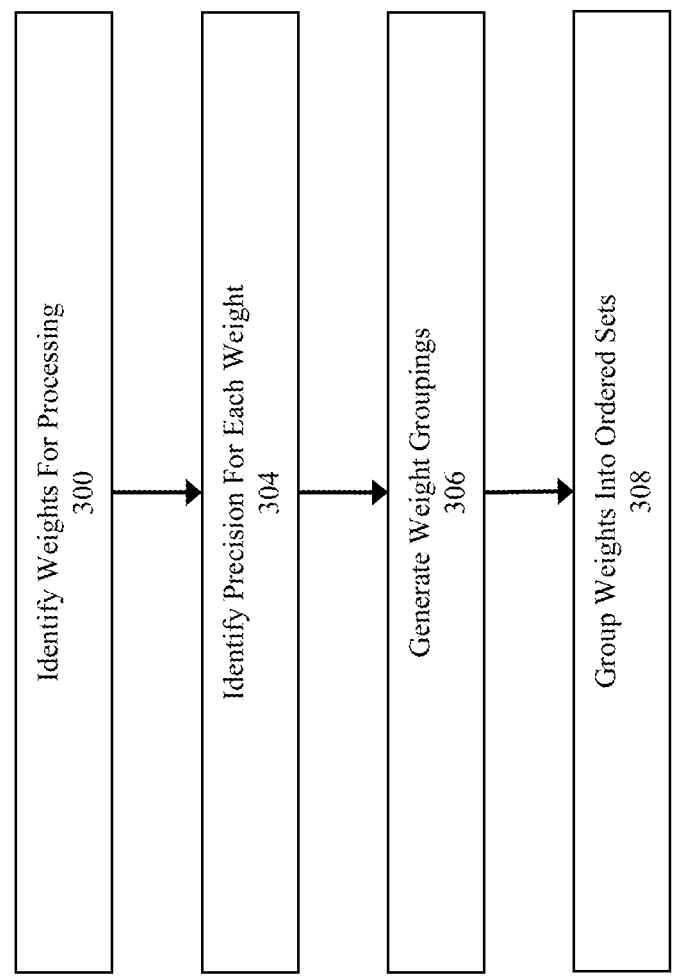
FIG. 3 illustrates an example process flow corresponding to the block titled generate ordered sets of the variable precision weights for the machine learning model and management data specifying the arrangement in block 214 of FIG. 2 according to some embodiments.

FIG. 3 illustrates an example process flow corresponding to the block titled generate ordered sets of the variable precision weights for the machine learning model and management data specifying the arrangement in block 214 of FIG. 2 according to some embodiments. Generally, this process will group weights based on their respective precisions.

The process starts at 300 where the weights for processing are identified. For instance, the weights in a machine learning model are identified from a dataset comprising the machine learning model. Each weight is then processed to determine what precision should be used for each weight at 304. In some embodiment, weight groupings comprise weights with the same precisions 306. In some embodiments, weights of different precisions can be provided in the same group. In some embodiments, weight groupings are determined beforehand and used to guide the precision reduction processes to slot each weight into one of a plurality of groups having different precisions. In some embodiments, multiple groups are used where one or more groups have weights on only one precision within each group but not necessarily across groups and one or more groups have weights of varying precision within a single respective group. Finally, at 308 the weights are grouped into the appropriate set as determined at 306.

Figure 4A:
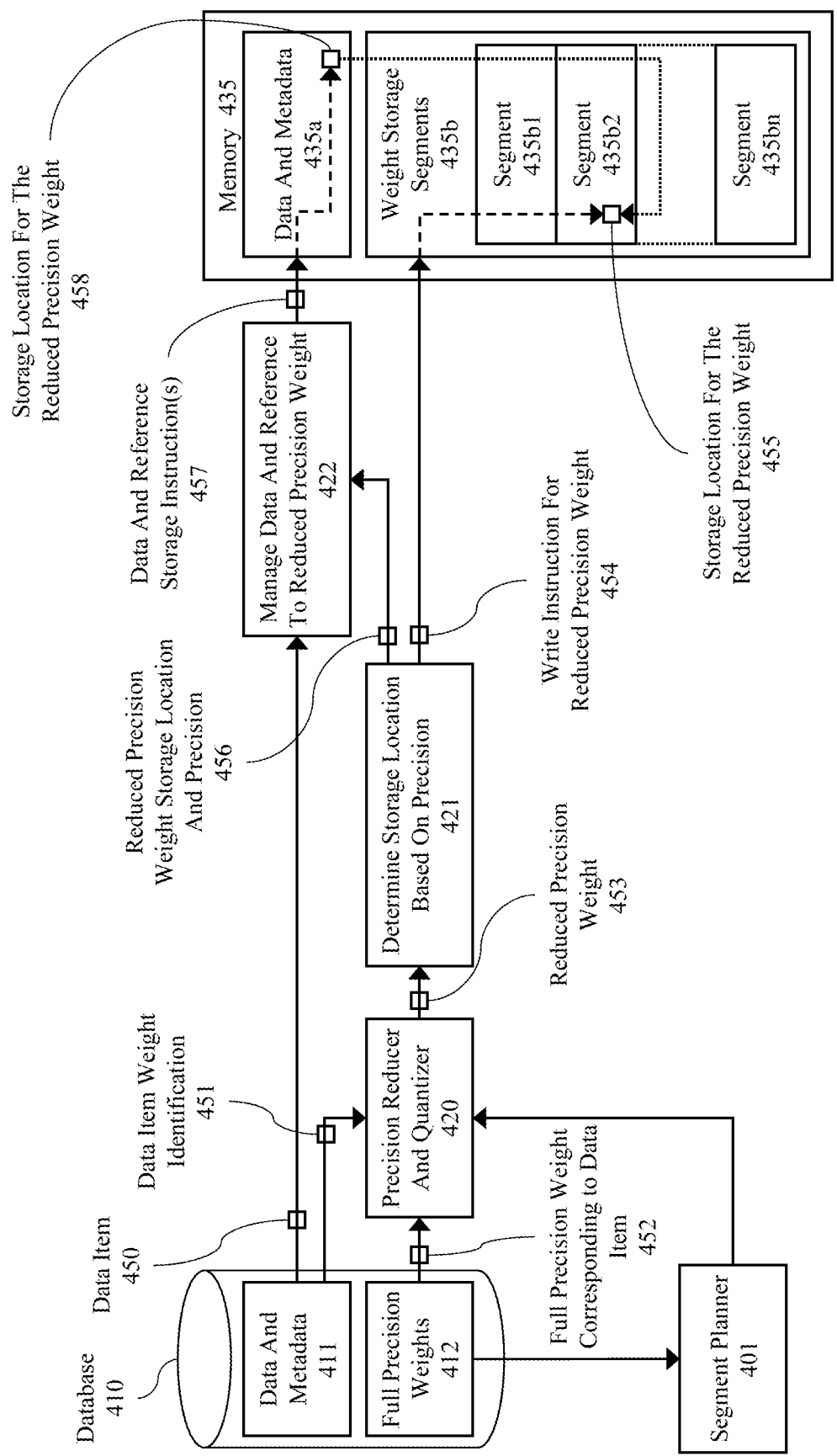
FIGS. 4A-4B illustrate an example arrangement and process flow according to an approach that includes a memory segmented for different weight precisions according to one embodiment.
Figure 4B:
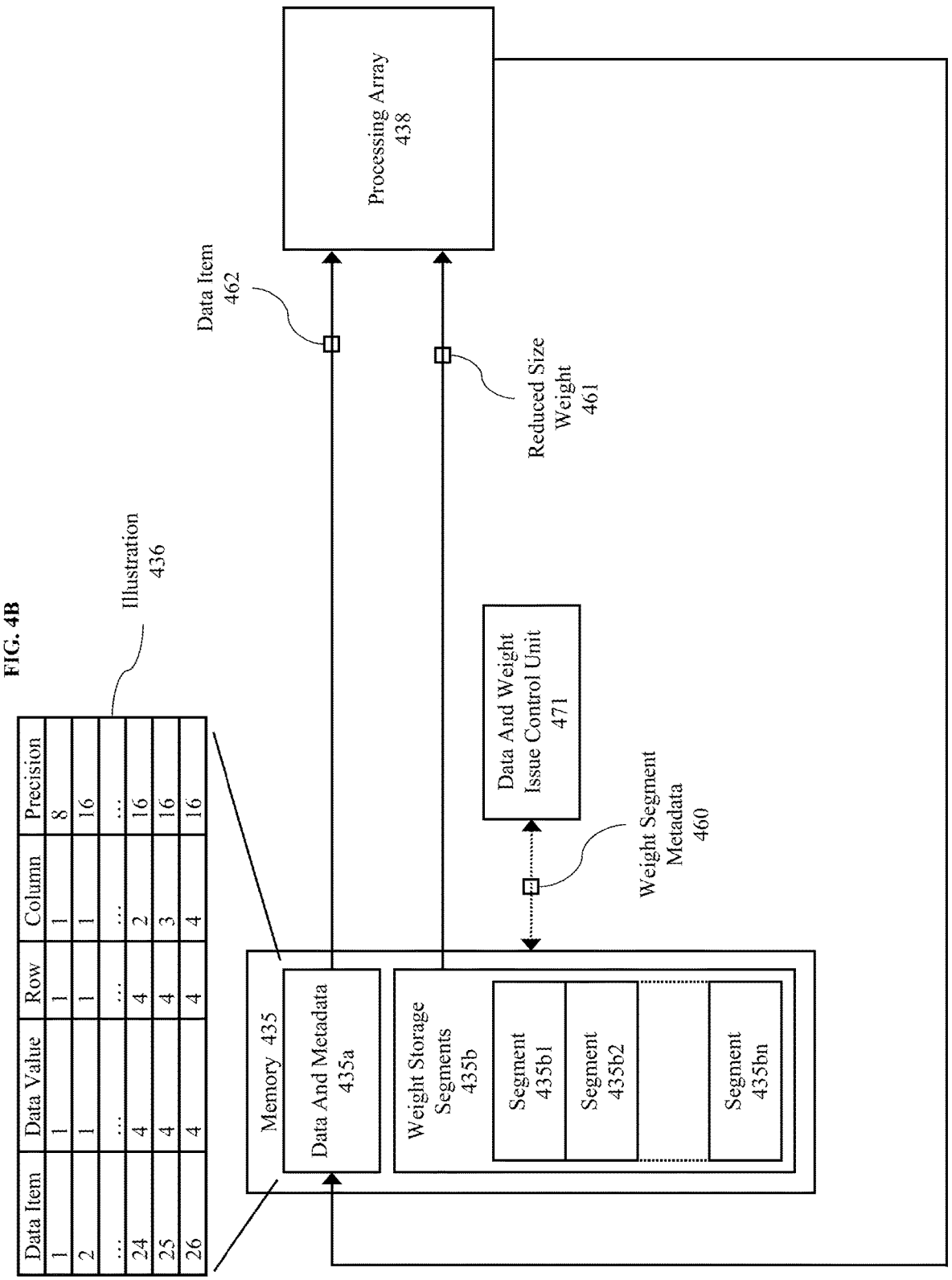

FIGS. 4A-4B illustrate an example arrangement and process flow according to an approach that includes a memory segmented for different weight precisions according to one embodiment. Generally, FIGS. 4A-4B illustrate a segment-based approach.

FIG. 4A illustrates the setup phase using an inline process that stores weights in a segment-based approach. Generally, the process of FIG. 4A could be completed as needed in response to a triggering event (e.g., receiving a machine learning processing job) or could be completed prior to receipt of a respective machine learning processing job.

Database 410 is essentially equivalent to data 110 and includes data and metadata 411 (similar to 111) and full precision weights (similar to 112). However, whereas FIGS. 1A-1B include a data and weight management unit 120, FIG. 4A illustrates separate components that are tailored to the segment-based approach illustrated here.

The database 410 is read and processed by the items 420-422 before being stored in the memory 435 for use in executing processing at the processing array. For example, for a respective data item (450) is associated with some information that identifies a corresponding weight (see 451). This weight identification 451 can be used by the precision reducer and quantizer 420 to identify a full precision weight for processing from 412 (see full precision weight at 452). The precision reducer and quantizer 420 can then map the full precision weight to a lower precision weight where appropriate. In some embodiments, the full precision weights can be analyzed prior to, or as part of, the inline precision reduction process to inform the segmenting of the memory. For example, a segment planner could provide a default segment arrangement, a segment arrangement based on the particular values of weights or number of weights, or any combination thereof. Furthermore, the segment planner could include one or more rules to select an efficient segmentation approach that analyzes the overhead necessary to manage each segment and balance that with the savings from reducing the precision of some or all weights. For instance, each segment could represent weights having different precisions, full precision, precision−x, precision−2x, precision minus 4x, and so on up to a threshold maximum reduction (e.g., 50% precision), where x represents some number of bits to be removed from respective weight representations.

The output of 420 comprises at least the reduced precision weight 453. At 421 a storage location is determined for the reduced precision weight, which can be output using a write instruction at 454. For example, the reduced precision weight 453 is stored in a corresponding segment (435b2) at 455. Additionally, information identifying the storage location (see 456) can be forwarded to an element to manage the data and the reference to the reduced precision weight. Specifically, an instruction(s) to write the data and the reference to the corresponding weight is output to the memory 435. This is illustrated in the figure at 458 where at least the storage location for the corresponding reduced precision weight is identified.

In some embodiments, weights can be received based on segment-based positioning after an identification of a segment to retrieve a weight from. For example, segment two could be identified as the segment to retrieve the next weight from. The weight is then retrieved by identifying the next position in the segment from which to retrieve that weight—e.g., a pointer to the next location, or an offset valued (used alone or in combination with a precision) to identify the location of the last/next weight for that particular segment, where each segment is associated with similar data for retrieval of a next weight when the segment is selected.

In some embodiments, a preprocessing approach performs the same operations as discussed above in regard to FIG. 4A to generate the representation of the reduced precision weights from the full precision weights 412 in the weight storage segments 435b. However, instead of storing the reduced precision weights, those weights and their associated data are stored in the database (e.g., 113) for future retrieval for executing a machine learning processing job.

FIG. 4B illustrates the use and management data for the segment-based approach to execute processing at the processing array.

In some embodiments, the metadata is represented by a table that associates data item(s) with respective data value(s). Each weight is identified by a corresponding row, column, and segment, where the segment is identified based on the precision for the weight in the same row. For instance, illustration 436 shows data item 1 has a data value of 1, and the corresponding weight is in row 1 column 1 of the segment for weights having a precision of 8-bits. Similarly, illustration 436 shows that data item 25 has a data value of 4 and a weight that is in row 4 column 3 of the segment for weights with a 16-bit precision. In some embodiments the data value may not be directly included as was shown in the illustration 436, where instead the data item is identified based on position information (e.g., with respect to a kernel and/or a layer for the corresponding machine learning model).

In some embodiments, a per layer quantization is applied during retraining to determine a default precision for each layer. All numbers use that layer's default precision unless otherwise indicated. To indicate numbers not using the default (per layer) precision, a counter is provided that resets at the beginning of processing for each layer and increments whenever a weight is used. This counter is then compared to stored values (e.g., in a buffer) that represent an index/position of a weight in the sequence that does not have the default precision for the layer. When the value of the counter matches a number in the stored values, a corresponding non-layer default precision is used to identify the weight. In some embodiments, each index/position value is associated with an occurrence number that indicates the number of weights with the same non-layer default precision in sequence. In some embodiments, instead of comparing a value of a counter to a position/index, a sequence of flags (e.g., binary values) are used to indicate whether the layer's default precision should be used, or a different precision.

The data and weight issue control unit 471 can be used to identify data and corresponding weights using the metadata (e.g., such as illustrated at 436). The corresponding weights (see e.g., reduced size weight 461 and data item 462) and data can then be sent to the processing array 438 for processing in any way known in the art. Additionally, the reduced precision weights can be extended inline where/if necessary at the processing array.

In some embodiments, multiple data items and/or weights are read using a single command. For instance, a row in a memory device could be read and processed before being written into a target location in the memory 435.

Figure 5A:
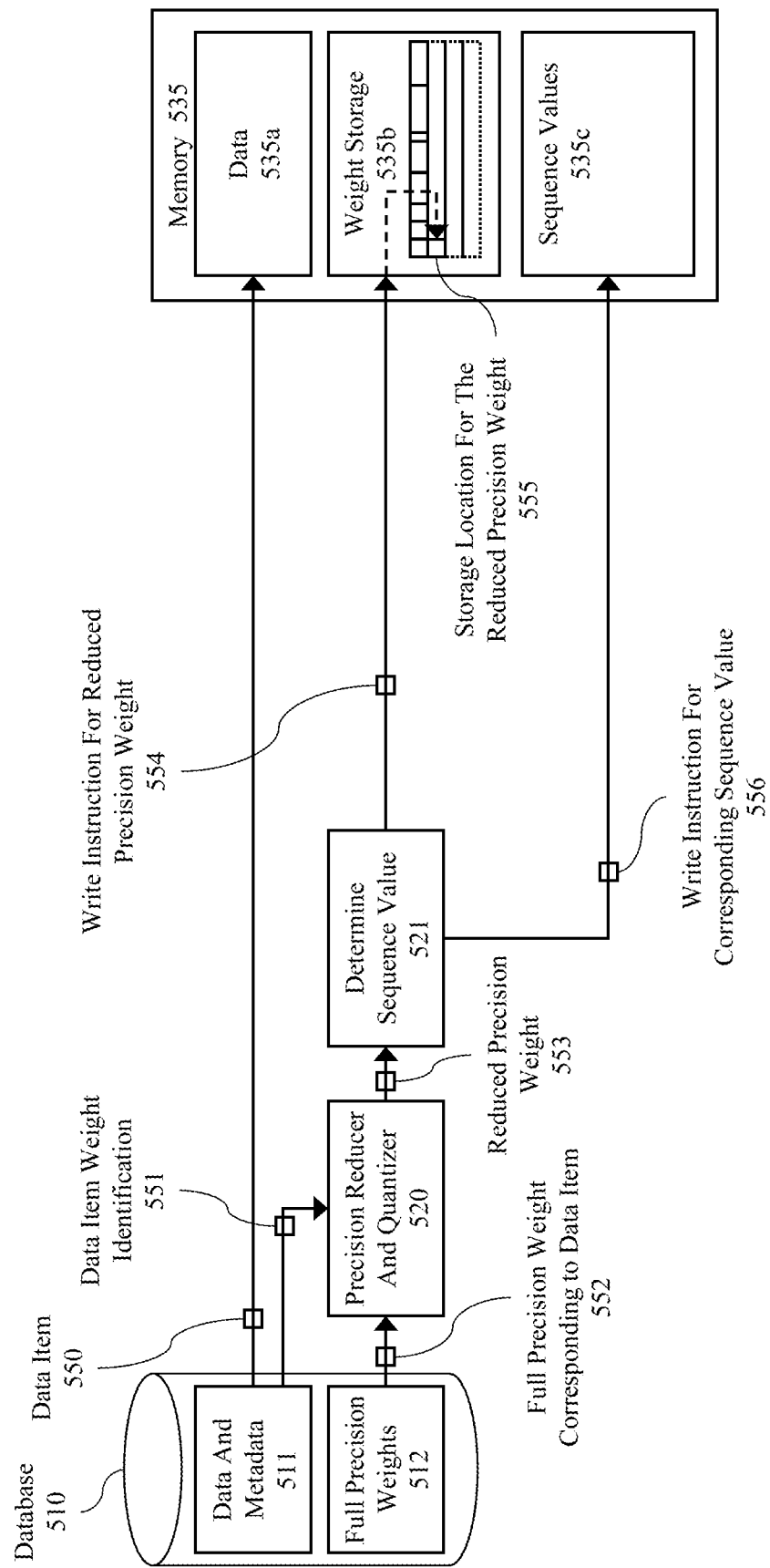

FIGS. 5A-5B illustrate an example arrangement and process flow according to an approach that includes a memory with weights of different precision intermingled according to one embodiment. Generally, FIGS. 5A-5B illustrate a sequence-based approach.

FIG. 5A illustrates the setup phase using an inline process that stores weights in a sequence of mixed precision values. Generally, the process of FIG. 5A could be completed as needed in response to a triggering event (e.g., receiving a machine learning processing job) or could be completed prior to receipt of a respective machine learning processing job.

Database 510 is essentially equivalent to data 110 and includes data and metadata 511 (similar to 111) and full precision weights (similar to 112). However, whereas FIGS. 1A-1B include a data and weight management unit 120, FIG. 5A illustrates separate components that are tailored to the sequence-based approach illustrated here.

The database 510 is read and processed by the items 520 and 521 before being stored in the memory 535 for use in executing processing at the processing array. For example, a respective data item (550) is associated with some information that identifies a corresponding weight (see 551). This weight identification 551 can be used by the precision reducer and quantizer 520 to identify a full precision weight for processing from 512 (see full precision weight at 552). The precision reducer and quantizer 520 can then map the full precision weight to a lower precision weight where appropriate.

The output of 520 comprises at least the reduced precision weight 553. At 521, a sequence value is determined for the weight. If the reduced precision weight 553 has a different precision from a previous weight or if this is the first weight, then the sequence value equals 1. However, if the reduced precision weight has the same precision as the previous weight then the previously stored/generated sequence value is incremented. There are multiple ways this can be managed at a low level. However, the processes will capture the numbers of weights with the same precision and the precision for those weights using a series of sequence values. For example, 3 weights with precision X followed by 7 weights with precision Y can be represented in the sequence by a number of weights and the corresponding precision—e.g., (3, X) and (7, Y). In some embodiments, when a sequence value is updated a write instruction(s) is issued to the memory 535 to write/update a corresponding sequence value, and a write instruction is issued for the weight (e.g., at 554) to the weight storage 535b. Finally, the data is also written to memory 535 at 535a. As a result, the approach will include a weight storage 535b that includes multiple weights stored in sequence including the present weight (see 555).

In some embodiments, a preprocessing approach performs the same operations as discussed above in regard to FIG. 4A to generate the representation of the reduced precision weights from the full precision weights 412 in the weight storage segments 435b. However, instead of storing the reduced precision weights in different segments, those weights are stored in the same weight storage memory/segment, such that weights with different precisions are intermingled together in a sequence, with the associated data being stored in the database (e.g., 113) for future retrieval for executing a machine learning processing job.

FIG. 5B illustrates the use and management data for the sequence-based approach to execute processing at the processing array.

In large part, the FIG. 5B illustration is similar to FIG. 4B. However, here, instead of using a table to identify segments, the approach uses sequence values to identify each respective weight and the corresponding size of those weights. This process can be managed by the data and weight issue control unit 571. For example, a set of sequence values (e.g., 552) can be used to identify the data corresponding to each weight from a list of weights having variable precising. This can be used to then issue data items (e.g., 550) and corresponding reduced size weights (551) to a processing array (e.g., 438).

In some embodiments, multiple data items and/or weights are read using a single command. For instance, a row in a memory device could be read and processed before being written into a target location in the memory 535.

SYSTEM ARCHITECTURE OVERVIEW

Figure 6:
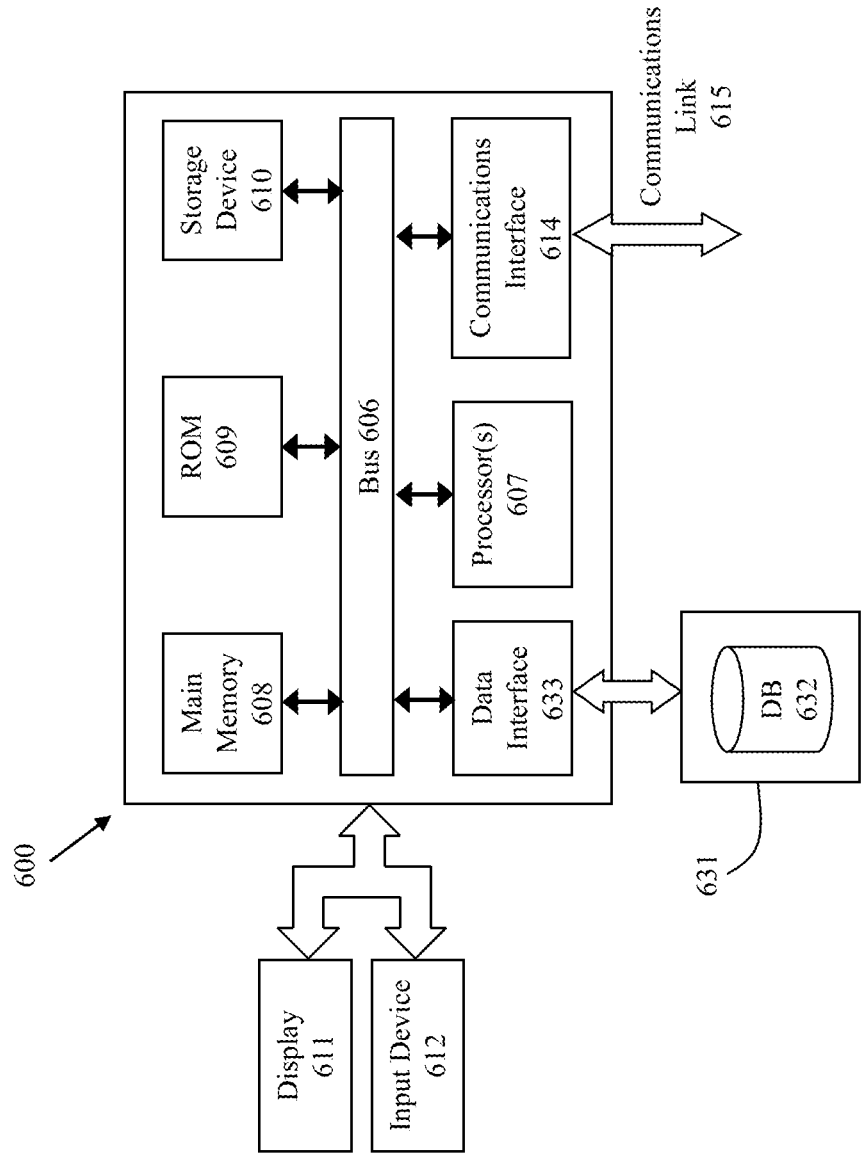
FIG. 6 shows an architecture of an example computing system with which the invention or parts of the invention may be implemented.

FIG. 6 shows an architecture of an example computing system with which the invention or parts of the invention may be implemented.

Computer system 600 includes a bus 606 or other communication mechanism for communicating information, which interconnects subsystems and devices, such as processor 607, system memory 608 (e.g., RAM), static storage device (e.g., ROM 609), storage device 610 (e.g., magnetic or optical disk drives), communication interface 614 (e.g., modem or Ethernet card), display 611 (e.g., CRT or LCD), input device 612 (e.g., keyboard), and cursor control.

According to one embodiment of the invention, computer system 600 performs specific operations by processor 607 executing one or more sequences of one or more instructions contained in system memory 608. Such instructions may be read into system memory 608 from another computer readable/usable medium, such as ROM 609 or storage device 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as storage device 610. Volatile media includes dynamic memory, such as system memory 608.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in storage device 610, or other non-volatile storage for later execution. Computer system 600 may communicate through a data interface 633 to a database 632 on an external storage device 631.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Thus, disclosed here is a method product and apparatus for providing an improved solution that does not suffer, or does not suffer to the same extent, to the same issues as full precision weight storage and exchange. For instance, where the precision of a plurality of weights can be represented in some form of a group, the management data used for specifying that representation and the data for the representation itself can be lesser then the data required for the full precision weights. This decreases the amount of storage space required and the amount of data that would need to be transferred from/over a combination of a database, memory, communications channels, and into a processing array.

What is claimed is:

1. A method, comprising:
identifying a machine learning model having a plurality of weights of a single precision;
generating an ordered set of variable precision weights for the machine learning model from the plurality of weights, wherein:
   a first subset of the ordered set of variable precision weights having a first precision are stored in a first memory segment and a second subset of the ordered set of variable precision weights having a second precision are stored in a second memory segment different from the first memory segment; or
   at least a portion of the ordered set of variable precision weights are stored in a single memory segment having weights of different precisions intermingled together in a sequence; and
generating management data specifying an arrangement of the ordered set of variable precision weights, wherein the management data comprises at least:
   a plurality of values for determining a memory segment used for storage of respective variable precision weights based on at least a corresponding precision; or
   a plurality of sequence value pairs corresponding to the portion of the ordered set of variable precision weights stored in the single memory segment having the weights of different precisions intermingled together in a sequence, each sequence value pair of the plurality of sequence value pairs identifies a precision and a number of sequential weights having the corresponding precision.

2. The method of claim 1, further comprising:
receiving a machine learning processing job having input data for processing;
identifying the management data specifying the arrangement of the ordered set of variable precision weights; and
identifying variable precision weights corresponding to input data for processing the machine learning processing job.

3. The method of claim 1, wherein each weight of the plurality of weights is analyzed to determine a precision for each weight and at least a first weight and a second weight have different precision.

4. The method of claim 2, wherein the ordered set of variable precision weights and the management data are generated prior to receipt of the machine learning processing.

5. The method of claim 1, wherein the management data is maintained in a relational database table having a first plurality of entries for the first memory segment and a second plurality of entries for the second memory segment.

6. The method of claim 1, wherein:
the first subset of the ordered set of variable precision weights having the first precision are stored in the first memory segment,
the second subset of the ordered set of variable precision weights having the second precision are stored in the second memory segment,
the portion of the ordered set of variable precision weights are stored in the single memory segment comprising a third memory segment having weights of different precisions intermingled together in the sequence, and
the first, second, and third memory segments are different memory segments.

7. The method of claim 1, wherein the ordered set of variable precision weights and the management data are generated for a machine learning processing job and in response to receipt of the machine learning processing job.

8. A non-transitory computer readable medium, having stored thereon a set of instructions which when executed by a processor causes a set of acts, the set of acts comprising:
identifying a machine learning model having a plurality of weights of a single precision;
generating variable precision weights for the machine learning model from the plurality of weights for the machine learning model, wherein:
   a first subset of the variable precision weights having a first precision are stored in a first memory segment and a second subset of the variable precision weights having a second precision are stored in a second memory segment different from the first memory segment; or
   at least a portion of the variable precision weights are stored in a single memory segment having weights of different precisions intermingled together in a sequence; and
generating management data specifying an arrangement of the variable precision weights, wherein the management data comprises at least:
   a plurality of values for determining a memory segment used for storage of respective variable precision weights based on at least a corresponding precision; or
   a plurality of sequence value pairs corresponding to the portion of the variable precision weights stored in the single memory segment having the weights of different precisions intermingled together in a sequence, each sequence value pair of the plurality of sequence value pairs identifies a precision and a number of sequential weights having the corresponding precision.

9. The computer readable medium of claim 8, wherein the set of acts further comprise:
receiving a machine learning processing job having input data for processing;
identifying the management data specifying the arrangement of the variable precision weights; and
identifying variable precision weights corresponding to input data for processing the machine learning processing job.

10. The computer readable medium of claim 8, wherein each weight of the plurality of weights is analyzed to determine a precision for each weight and at least a first weight and a second weight have different precision.

11. The computer readable medium of claim 9, wherein the variable precision weights and the management data are generated prior to receipt of the machine learning processing job.

12. The computer readable medium of claim 8, wherein the management data is maintained in a relational database table having a first plurality of entries for the first memory segment and a second plurality of entries for the second memory segment.

13. The computer readable medium of claim 8, wherein:
the first subset of the variable precision weights having the first precision are stored in the first memory segment,
the second subset of the variable precision weights having the second precision are stored in the second memory segment,
the portion of the variable precision weights are stored in the single memory segment comprising a third memory segment having weights of different precisions intermingled together in the sequence, and
the first, second, and third memory segments are different memory segments.

14. The computer readable medium of claim 13, wherein the variable precision weights and the management data are generated for a machine learning processing job and in response to receipt of the machine learning processing job.

15. A computer system, comprising:
a memory comprising a set of instructions; and
a processor that executes the set of instructions to perform a set of acts comprising:
identifying a machine learning model having a plurality of weights of a single precision;
generating, from a plurality of weights corresponding to a machine learning model, a set of weights having variable precision, wherein:
a first subset of the set of weights having a first precision are stored in a first memory segment and a second subset of the of the set of weights having a second precision are stored in a second memory segment different from the first memory segment; or
at least a portion of the set of weights having variable precision are stored in a single memory segment having weights of different precisions intermingled together in a sequence; and
generating management data specifying an arrangement of the set of weights having variable precision, wherein the management data comprises at least:
a plurality of values for determining a memory segment used for storage of respective variable precision weights based on at least a corresponding precision; or
a plurality of sequence value pairs corresponding to the portion of the set of the weights having variable precision stored in the single memory segment having the weights of different precisions intermingled together in a sequence, each sequence value pair of the plurality of sequence value pairs identifies a precision and a number of sequential weights having the corresponding precision.

16. The computer system of claim 15, wherein the set of acts further comprise:
receiving a machine learning processing job having input data for processing;
identifying the management data specifying the arrangement of the set of weights having variable precision; and
identifying variable precision weights corresponding to input data for processing the machine learning processing job.

17. The computer system of claim 15, wherein each weight of the plurality of weights is analyzed to determine a precision for each weight and at least a first weight and a second weight have different precision.

18. The computer system of claim 16, wherein the weights having variable precision and the management data are generated prior to receipt of the machine learning processing job.

19. The computer system of claim 15, wherein the management data is maintained in a relational database table having a first plurality of entries for the first memory segment and a second plurality of entries for the second memory segment.

20. The computer system of claim 15, wherein:
the first subset of the set of weights having the first precision are stored in the first memory segment,
the second subset of the of the set of weights having the second precision are stored in the second memory segment, and
the portion of the set of weights having variable precision are stored in the single memory segment comprising a third memory segment having weights of different precisions intermingled together in a sequence,
the first, second, and third memory segments are different memory segments, and the weights having variable precision and the management data are generated for a machine learning processing job and in response to receipt of the machine learning processing job.

* * * * *